US006321127B1

(12) United States Patent
Kondo

(10) Patent No.: US 6,321,127 B1
(45) Date of Patent: Nov. 20, 2001

(54) METHOD FOR PROVIDING COMMUNICATION BETWEEN CONTROLLERS AND COMMUNICATION DEVICE USED WITH THE CONTROLLERS

(75) Inventor: Kentaro Kondo, Hamamatsu (JP)

(73) Assignee: Suzuki Motor Corporation, Hamamatsu (JP)

( * ) Notice: Subject to any disclaimer, the term of this patent is extended or adjusted under 35 U.S.C. 154(b) by 0 days.

(21) Appl. No.: 09/259,664

(22) Filed: Feb. 26, 1999

(30) Foreign Application Priority Data

Mar. 5, 1998 (JP) ................................................ 10-071503

(51) Int. Cl.[7] ..................................................... G05B 13/02
(52) U.S. Cl. ............................................. 700/33; 340/3.43
(58) Field of Search .................................... 700/79–82, 2, 700/3, 33; 701/29; 340/870.17, 3.42–3.44

(56) References Cited

U.S. PATENT DOCUMENTS

| | | | | |
|---|---|---|---|---|
| 4,715,463 | * | 12/1987 | Shimizu | 180/446 |
| 4,748,567 | * | 5/1988 | Sumizawa et al. | 701/114 |
| 4,791,569 | * | 12/1988 | Suzuki | 701/102 |
| 5,111,383 | * | 5/1992 | Kimura et al. | 700/79 |
| 5,454,001 | * | 9/1995 | Nagatani et al. | 714/821 |
| 5,697,466 | * | 12/1997 | Moroto et al. | 180/65.2 |
| 5,966,305 | * | 10/1999 | Watari et al. | 700/82 |
| 6,025,655 | * | 2/2000 | Hopf | 307/10.2 |

FOREIGN PATENT DOCUMENTS

| | | |
|---|---|---|
| 5-233577 | 9/1993 | (JP) . |
| 5-263710 | 10/1993 | (JP) . |
| 7-69093 | 3/1995 | (JP) . |

* cited by examiner

*Primary Examiner*—William Grant
*Assistant Examiner*—Zoila Cabrera
(74) *Attorney, Agent, or Firm*—Flynn, Thiel, Boutell & Tanis, P.C.

(57) ABSTRACT

A method for providing communication between controllers in which fewer communication lines are needed. The controllers include a first controller functioning to feed at least first and second data signals into a second controller at a next step, and further to feed first and second abnormality signals into the controller at the next step when the presence of abnormalities is determined. One of the first and second data signals as well as both of the first and second abnormality signals are fed into the controller at the next step from the first controller through a common communication line.

8 Claims, 5 Drawing Sheets

DURING "THW" ABNORMALITY (XDTHWHNF=1, XDTHWLNF=1) ———— TLL (T1=4.91ms)

DURING A/C ABNORMALITY ———— TUu (T1= (29.43ms)

T=32.7ms (30.6Hz)

METHOD FOR PROVIDING COMMUNICATION BETWEEN CONTROLLERS AND COMMUNICATION DEVICE USED WITH THE CONTROLLERS

FIELD OF THE INVENTION

This invention relates to a method for providing communication between controllers and a communication device used with the controllers. More particularly, it relates to a method for providing communication between controllers and a communication device used with the controllers, in which fewer communication lines are needed, reduced costs are achieved, and a space-saving and lighter-weight mobile body having the controllers disposed therein is attained.

BACKGROUND OF THE INVENTION

In some mobile bodies, such as vehicles, a plurality of controllers are disposed therein in order to control an engine and a transmission, which are also provided in the mobile body, and data signals are communicated between the controllers to this end. An example of a communication device to be used with the aforesaid controllers is shown in FIG. 6. In FIG. 6, reference numeral 302 denotes a first or engine controller for controlling an engine (not shown); 304 a second controller or drive system controller for controlling an automatic transmission (not shown); and, 306 a communication device between the engine controller 302 and the drive system controller 304.

At least first and second data output means, more specifically, a water temperature sensor 308 and an air conditioner (A/C) 310 are provided and connected to the engine controller 302 through first and second signal lines, more specifically a water temperature signal line 312 and an air-conditioning signal line 314, respectively. In addition, the engine controller 302 is linked to different data output means other than the water temperature sensor 308, that is, various sensors (not shown) for outputting other data signals indicative of a throttle opening, the number of engine revolutions and the like.

The water temperature sensor 308 feeds a water temperature signal into the controller 302 by way of a first data signal. The water temperature signal is a signal providing information on how the engine is running. The air-conditioner 310, which is driven by the engine, delivers a drive information signal, i.e., an air-conditioning on/off signal, to the controller 302 by way of a second data signal.

The engine controller 302 has the function of entering thereinto the water temperature signal from the sensor 308, the air-conditioning signal from the air conditioner 310, and other data signals, and then feeding the same signals into the drive system controller 304 at the following step. The engine controller 302 provides control over engine ignition timing and fuel in response to the entered water temperature signal and other data signals, while effecting control over activation and deactivation of the air conditioner 310 in accordance with the air-conditioning signal.

Turning now to FIGS. 7 and 8, the aforesaid water temperature signal is converted into duty value "T1" when being delivered to the drive system controller 304 from the engine controller 302. The duty value varies with water temperature. More specifically, such a converted signal is entered into the drive system controller 304 at any value within predetermined range "R", which range is defined by upper limit "TU" (e.g., 26.6 milliseconds) and lower limit "TL" (e.g., 9.81 milliseconds). FIG. 8 shows an overall duty cycle of a water temperature output (WTO) having a value T of 32.7 milliseconds corresponding to 30.6 Hz.

The engine controller 302 determines the presence or absence of abnormalities such as failures of the water temperature sensor 308 and/or the air conditioner 310 as well as disconnection of the water temperature signal line 312 and/or the air-conditioning signal line 314 on the basis of the entered data signals such as the water temperature signal and/or the air-conditioning signal. When a determination is made that such abnormalities are present, then the engine controller 302 feeds first and second abnormal signals into the drive system controller 304 at the next step. The first abnormal signal is a water temperature abnormal signal representing an abnormal state of the water temperature sensor 308, while the second abnormal signal is an air-conditioning abnormal signal indicating an abnormal state of the air conditioner 310, as described in detail hereinafter.

The data signals are output and communicated from the engine controller 302 to the drive system controller 304 through the communication device 306. The communication device 306 allows the engine controller 302 to be linked to the drive system controller 304 through first, second, and third communication lines which are a water temperature communication line 316, an air-conditioning communication line 318, and an air-conditioning abnormality communication line 320, respectively.

The communication device 306 permits the water temperature and air-conditioning signals to be entered into the drive system controller 304 from the engine controller 302 through the water temperature communication line 316 and the air-conditioning communication line 318. The drive system controller 304 provides gearshift control and slip control in accordance with the entered water temperature signal and air-conditioning signal. The gearshift control changes an engaged state of an auxiliary gearshift mechanism in the automatic transmission, while the slip control brings a lock-up clutch into semi-clutch engagement.

When the engine controller 302 determines, according to the water temperature signal, that the water temperature sensor 308 is in an abnormal state, then the communication device 306 allows the above-mentioned water temperature abnormal signal defined by the equation XDTHWHNF=1 to be fed into the drive system controller 304 through the water temperature communication line 316.

At this time, the water temperature abnormal signal is entered into the drive system controller 304 at any value beyond the aforesaid predetermined range "R". More specifically, the same abnormal signal is fed into the drive system controller 304 through the water temperature communication line 316 at lower limit-lessened value "$TL_L$" beyond the predetermined range, which value is less than lower limit "TL", as illustrated by a broken line in FIG. 7.

Further, when the engine controller 302 determines, according to the air-conditioning signal, that the air conditioner 310 is in an abnormal state defined by the equation XDTHWLNF=1, then the communication device 306 allows the above-mentioned air-conditioning abnormal signal to be fed into the drive system controller 304 through the air-conditioning abnormality communication line 320.

Examples of the above-described communication device are disclosed in published Japanese Patent Application Laid-Out Nos. 5-263710, 5-233577, and 7-69093.

A device according to the aforesaid Application No. 5-263710 includes first and second central processors. The first central processor calculates a drive amount of an actuator, and transmits a fail signal when a failure occurs. The second central processor controls the actuator in accordance with data of the drive amount which is sent from the first central processor. When abnormalities occur, then the first central processor transmits data as the fail signal to the second central processor, which data indicates a drive amount exceeding a limit of the drive amount of the actuator.

Another device according to the above Application No. 5-233577 includes at least three central processors and a fail communication line and a help communication line. One of the above processors is a main central processor, while the remainder are subordinate central processors. The above communication lines are disposed between the main processor and the subordinate processors for communicating a fail signal. When abnormalities occur, then the central processor sends the fail signal to the main processor, which in turn communicates the occurrence of the abnormalities to the subordinate processors through the aforesaid communication lines.

A further device according to the above Application No. 7-69093 is a failure-diagnosing device including first and second operational state-detecting means and first and second controllers for diagnosing failures which occur in either the detecting means or the controllers. The failure-diagnosing device is characterized by a first failure-detecting means, a first failure signal output means, a second failure-detecting means, a second failure signal output means, a converting means, and a determining and diagnosing means.

In the communication device 306 as shown in FIG. 6, when the water temperature sensor 308 is abnormal, then the water temperature abnormality signal is communicated to the drive system controller 304 through the water temperature communication line 316.

However, an inconvenience is encountered when the air conditioner is abnormal. That is, even if an effort is made to communicate the air-conditioning abnormality signal to the drive system controller 304 through the air-conditioning communication line 318, such an abnormal state cannot be delivered to the drive system controller 304 because the air-conditioning signal is a drive information signal indicating that the air conditioner 310 is switched either on or off.

Therefore, the communication device 306 must conventionally be provided with a dedicated communication passage to indicate abnormalities in the air conditioner, i.e., the air-conditioning abnormality communication line 320, independent of the air-conditioning communication line 318. Accordingly, there is no choice but to communicate the presence of the abnormalities in the air conditioner 310 through the aforesaid communication line 320. This causes another inconvenience of more communication lines and higher cost.

SUMMARY OF THE INVENTION

In order to obviate the above inconveniences, one aspect of the present invention comprises a method for providing communication between controllers, in which the controllers include a first controller functioning to enter thereinto at least first and second data signals from first and second data output means respectively, and then to feed the same signals into another (i.e., a second) controller at a next step, the first controller further functioning to determine whether there are abnormalities in the data output means on the basis of the entered first and second data signals. The first controller still further functions to feed first and second abnormality signals into the second controller at the next step when a determination is made that there are abnormalities present in the data output means. The first and second abnormality signals represent respective abnormal states of the first and second data output means, wherein one of the first and second data signals, as well as both of the first and second abnormality signals, are fed into the second controller at the next step from the first controller through a common communication line.

In the above-described method for providing communication between controllers, the controllers include the second controller functioning to enter thereinto the first and second data signals as well as the first and second abnormality signals, all of which signals are fed from the first controller, and wherein the first controller feeds one of the first and second data signals into the second controller at any value within a predetermined range, the predetermined range being defined by upper and lower limit values. The first controller feeds the first and second abnormality signals into the second controller at an upper limit-exceeding value and a lower limit-lessened value, respectively, in which the upper limit-exceeding value is greater than the upper limit value, while the lower limit-lessened value is less than the lower limit value. Both of the upper limit-exceeding value and the lower limit-lessened value fall beyond the predetermined range.

A further aspect of the present invention provides a communication device used with controllers, in which the controllers include first and second controllers, wherein the first controller is provided with first and second data output means having the function of feeding at least first and second data signals respectively into the first controller, the first controller functioning to enter thereinto the first and second data signals and then to feed the same signals into a second controller at a next step in a state of the first controller being connected to the first and second data output means through first and second signal lines, respectively. The first controller further functions to determine the presence of abnormalities on the basis of the first and second data signals. The first controller still further functions to feed first and second abnormality signals into the second controller at the next step when a determination is made that there are abnormalities present in the data output means. The first and second abnormality signals represent respective abnormal states of the first and second data output means. The second controller is connected to the first controller through first and second communication lines, the second controller functioning to enter thereinto one of the first and second data signals as well as both of the first and second abnormality signals, all of which signals are fed into the second controller from the first controller through one of the first and second communication lines. The second controller further functions to enter thereinto the other of the first and second data signals which are fed into the second controller from the first controller through the other of the first and second communication lines. With reference to the above-described communication device, the first and second data output means are specifically engine auxiliary machines provided on an engine, the engine being disposed in a mobile (i.e., vehicle) body. The first controller is specifically an engine controller for controlling the vehicle engine, and the second controller is specifically a drive system controller for controlling a drive system connected to the engine.

In the method for providing communication between controllers pursuant to the present invention, the first controller functions to feed at least the first and second data signals into another (i.e., a second) controller at a next step, and further to feed the first and second abnormality signals into the second controller at the next step when a determination is made that there are abnormalities present in the data output means. Then, one of the first and second data signals, as well as both of the first and second abnormality signals, are fed into the second controller at the next step from the first controller through a common communication line. Thus, one data signal and two abnormality signals can be communicated by the common use of one communication line.

In the above method, the controllers include the second controller functioning to enter thereinto the first and second data signals as well as the first and second abnormality signals, all of which signals are fed from the first controller. The first controller feeds one of the first and second data signals into the second controller at any value within a predetermined range, which range is defined by upper and lower limit values. In addition, the first controller feeds the first and second abnormality signals into the second controller at an upper limit-exceeding value and a lower limit-lessened value, respectively. The upper limit-exceeding value is greater than the upper limit value, while the lower limit-lessened value is less than the lower limit value, with both of the upper limit-exceeding value and the lower limit-lessened value falling beyond the predetermined range. As a result, one data signal and two abnormality signals can be communicated and distinctly separated from each other.

In the communication device according to the present invention, the first controller functions to enter thereinto at least the first and second data signals from the first and second data output means and then feeds the same signals into a second controller at the next step. The first controller further functions to feed first and second abnormality signals into the second controller at the next step when a determination is made that there are abnormalities present in the data output means. The second controller is connected to the first controller through the first and second communication lines. The second controller serves to enter thereinto one of the first and second data signals, as well as both of the first and second abnormality signals, all of which signals are fed into the second controller from the first controller through one of the first and second communication lines. The second controller further serves to enter thereinto the other of the first and second data signals which are fed into the second controller from the first controller through the other of the first and second communication lines. Thus, one data signal and two abnormality signals can be communicated by one communication line being shared in common.

With reference to the above-described communication device, the first and second data output means are specifically engine auxiliary machines provided on an engine, which engine is disposed in a mobile body. The first controller is specifically an engine controller for controlling the engine. The second controller is specifically a drive system controller for controlling a drive system connected to the engine. Thus, the common use of the communication line provides fewer communication lines, and further provides a common signal-processing section associated with the controllers. Thus, compact controllers can be realized.

DETAILED DESCRIPTION

Figure 1:
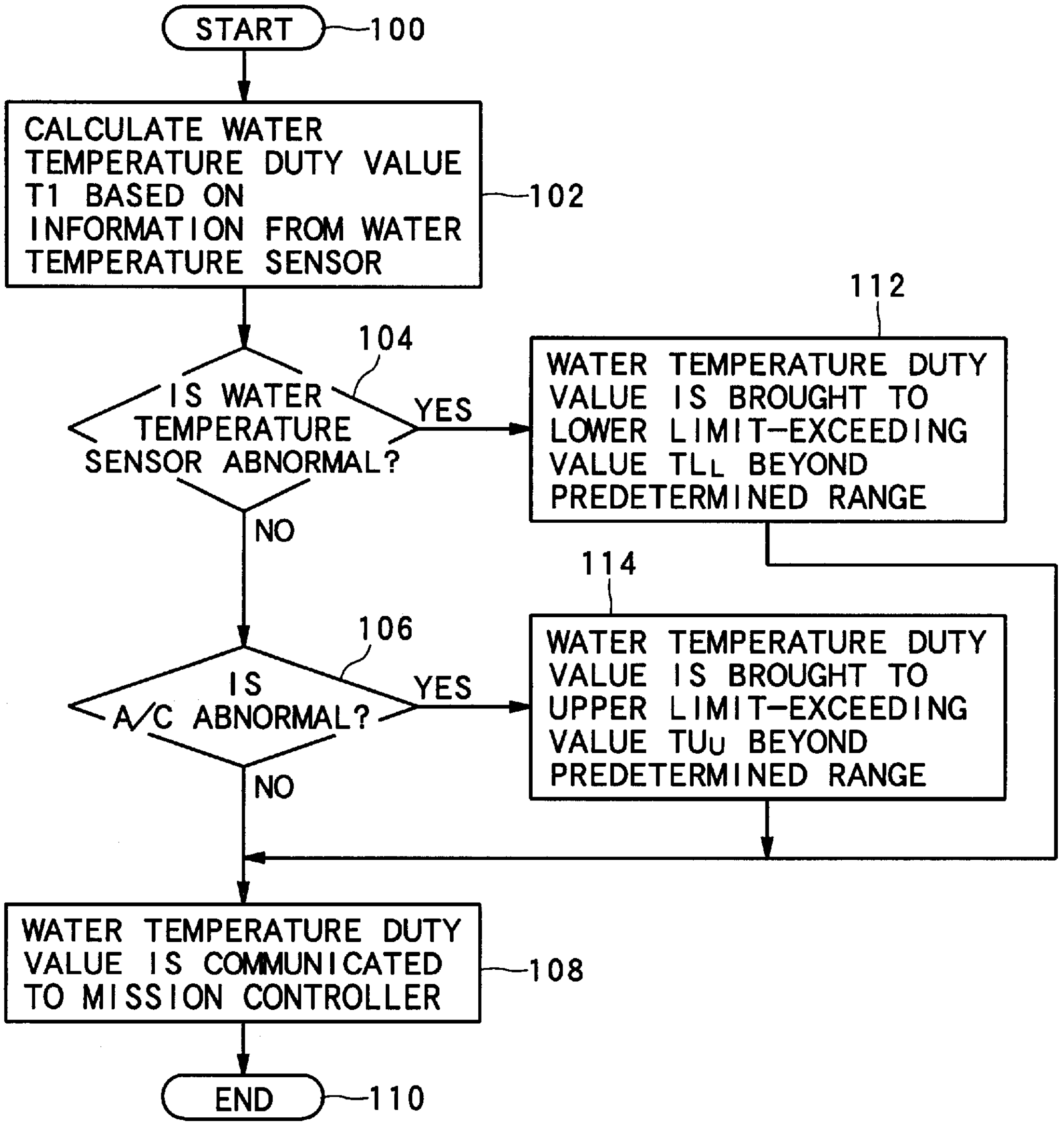
FIG. 1 is a flow chart illustrating how control is executed on the transmitting side of a communication device pursuant to an embodiment of the present invention.

An embodiment of the present invention will now be described with reference to FIGS. 1–5. In FIG. 5, reference numeral 2 denotes a first controller, or rather an engine controller, for controlling an engine (not shown), which engine is disposed in a mobile body (not shown) such as a vehicle. A second controller 4, or rather a drive system controller, controls an automatic transmission (not shown) in a drive system, which transmission is connected to the engine. A communication device 6 is connected between the engine controller 2 and the drive system controller 4.

At least first and second data output means of auxiliary machines or devices disposed on the engine, more specifically, a water temperature sensor 8 and an air conditioner 10 are provided and connected to the engine controller 2 through first and second signal lines, more specifically a water temperature signal line 12 and an air-conditioning signal line 14 respectively. In addition, a throttle opening sensor 16 and an engine speed sensor 18 are provided by way of data output means other than the sensor 8 and the air conditioner 10, and are further linked to the engine controller 2 through third and fourth signal lines, more specifically a throttle opening signal line 20 and an engine speed signal line 22 respectively.

The water temperature sensor 8 has the function of feeding an engine-running information signal, i.e., a water temperature signal, into the engine controller 2 by way of a first data signal. The air conditioner 10 is driven by the engine, and has the function of feeding a drive information signal, i.e., an air-conditioning on/off signal, into the engine controller 2 by way of a second data signal. The throttle opening sensor 16 functions to deliver another engine-running information signal, i.e., a throttle opening signal, to the engine controller 2 by way of a third data signal. The engine speed sensor 18 functions to output a further engine-running information signal, i.e., an engine speed signal, into the engine controller 2 by way of a fourth data signal.

The engine controller 2 has the function of entering thereinto the water temperature signal from the sensor 8, the air-conditioning signal from the air conditioner 10, the throttle opening signal from the sensor 16, and the engine speed signal from the sensor 18, and then feeding both the water temperature signal and the air-conditioning signal into the drive system controller 4 at the following step.

The engine controller 2 provides control over engine ignition timing and fuel in response to the entered water temperature signal and throttle-opening signal, while effecting control over activation and deactivation of the air conditioner 10 in accordance with the air-conditioning signal. At this time, the engine controller 2 executes control over the above-mentioned ignition timing and fuel in accordance with a D-range signal and first and second slip signals, in conjunction with the water temperature signal and the throttle-opening signal, while practicing control over the activation and deactivation of the air conditioner 10 in response to the air-conditioning signal. The D-range signal represents a state in which the automatic transmission has been selected to be a Drive-range. The D-range signal and the first and second slip signals are entered from the drive system controller 4, details of which are described hereinafter.

Figure 3:
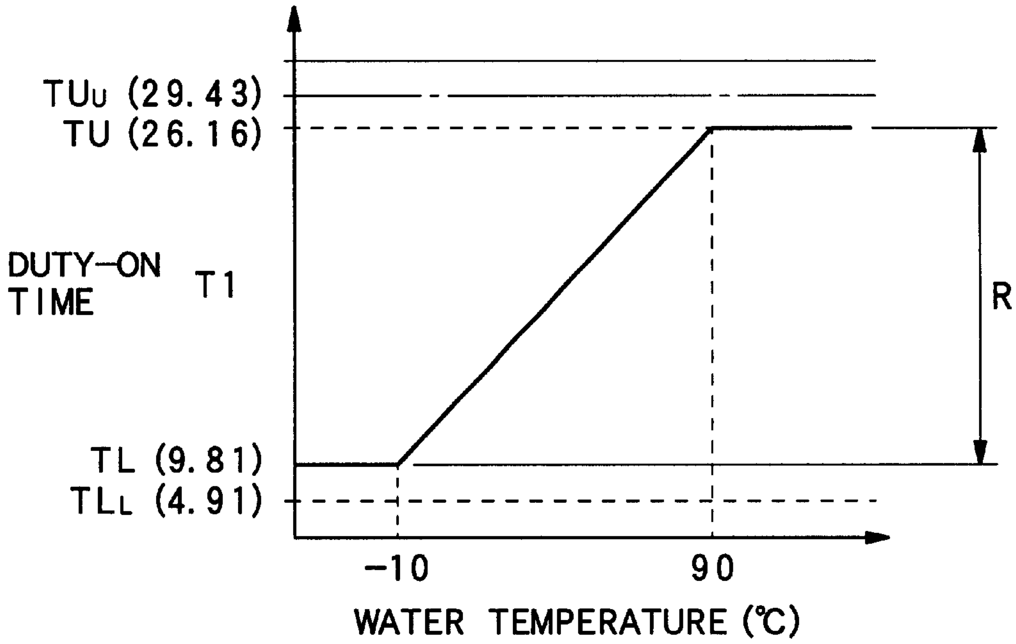
FIG. 3 is an illustration showing a relationship between water temperature and duty value.
Figure 4:
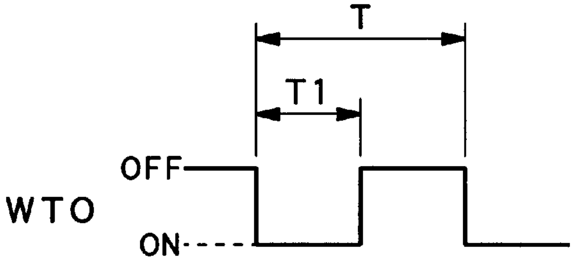
FIG. 4 is an illustration showing settings of the duty value in accordance with the water temperature.
Figure 5:
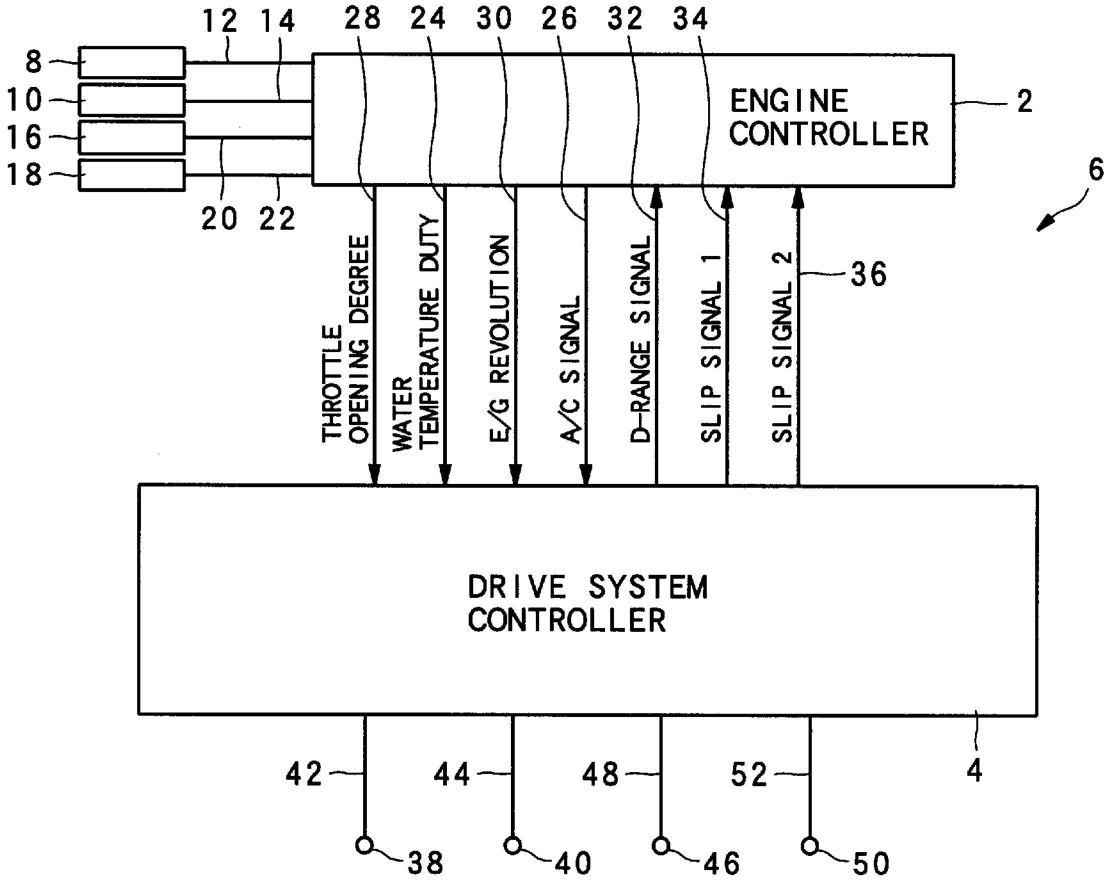
FIG. 5 is a schematic structural view showing the communication device.

Referring now to FIGS. 3 and 4, the water temperature signal is converted into duty value "T1" when being fed into the drive system controller 4 from the engine controller 2. The duty value varies with water temperature. More specifically, such a converted signal is fed into the drive system controller 4 at any value within a predetermined range "R", which range is defined by upper limit "TU" (e.g., 26.6 milliseconds) and lower limit "TL" (e.g., 9.81 milliseconds).

Figure 7:
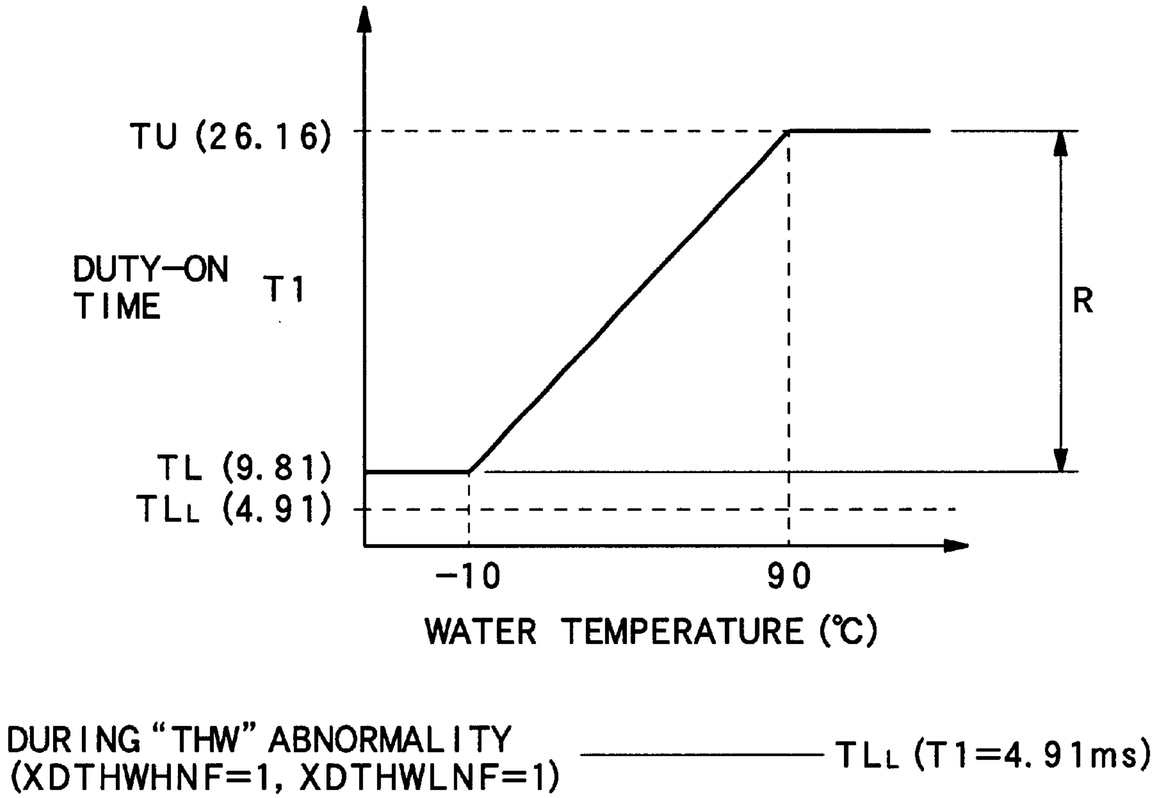
FIG. 7 PRIOR ART
FIG. 7 is a prior art illustration showing a relationship between water temperature and duty value.
Figure 8:
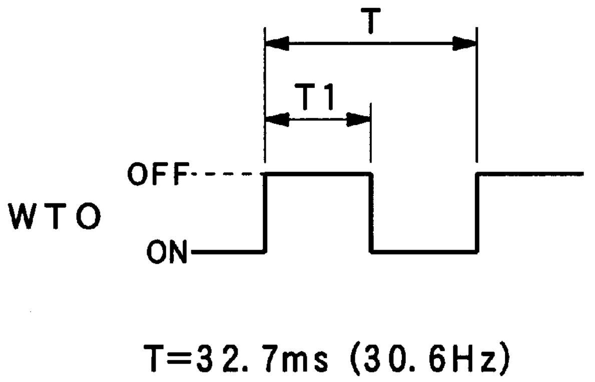
FIG. 8 PRIOR ART
FIG. 8 is a prior art illustration showing settings of the duty value in accordance with the water temperature.

The engine controller 2 functions to determine the presence or absence of abnormalities such as failures in the water temperature sensor 8 and/or the air conditioner 10 as well as disconnection of the water temperature signal line 12 and/or the air-conditioning signal line 14 on the basis of the entered data signals such as the water temperature signal and/or the air-conditioning signal. When a determination is made that such abnormalities are present, then the engine controller 2 serves to feed first and second abnormal signals into the drive system controller 4 at the following step. The first abnormal signal is a water temperature abnormal signal representing an abnormal state of the water temperature sensor 8 defined by the symbol XDTHWHNF as illustrated in FIGS. 3 and 7. The symbol is used to denote whether or not water temperature has an abnormal high temperature indicating failure of the water temperature sensor. The equation XDTHWHNF=1 indicates that the water temperature sensor is at an abnormal high temperature. The equation XDTHWHNF=0 shows that the water temperature is not at an abnormal high temperature and is within the proper range of values. The second abnormal signal is an air-conditioning abnormal signal indicating an abnormal state of the air conditioner 10 as defined by the symbol XDTHWLNF which denotes whether or not water temperature is at an abnormal low temperature. The equation XDTHWLNF=1 indicates that water temperature is an abnormal low temperature meaning there is a malfunction or error in the air-conditioning. The equation XDTHWLNF=0 shows that water temperature is not at an abnormal low temperature. The abnormal stat data signals are described in detail hereinafter.

The data signals are output and communicated from the engine controller 2 to the drive system controller 4 through the communication device 6. The communication device 6 is provided to cause the engine controller 2 to be connected to the drive system controller 4 through first and second communication lines, i.e., a water temperature communication line 24 and an air-conditioning communication line 26, respectively.

Further, the communication device 6 is provided to permit the engine controller 2 to be linked to the drive system controller 4 through third, fourth, fifth, sixth, and seventh signal lines which are a throttle-opening communication line 28, an engine speed communication line 30, a D-range signal line 32, a first slip signal line 34, and a second slip signal line 36, respectively.

The drive system controller 4 controls an automatic transmission which is provided with a torque converter and an auxiliary gearshift mechanism (not shown). The drive system controller 4 is provided with and is connected to first and second solenoids 38 and 40 through first and second control lines, more specifically first and second solenoid control lines 42 and 44, respectively, thereby driving the auxiliary gearshift mechanism into shifting actions. The drive system controller 4 is further provided with and is linked to a lock-up solenoid 46 through a third control line, i.e., a lock-up solenoid control line 48, thereby bringing a direct-connectable lock-up clutch (not shown) into connecting and releasing actions. The lock-up clutch is provided on the torque converter. Moreover, the drive system controller 4 is provided with and is linked to a pressure control solenoid 50 through a fourth control line, i.e., a pressure control solenoid line 52, thereby controlling hydraulic pressure in a hydraulic control mechanism (not shown). The hydraulic control mechanism is provided on the automatic transmission.

The drive system controller 4 serves to input thereinto the water temperature signal and air-conditioning signal, the throttle opening signal and engine speed signal, and the water temperature abnormal signal and air-conditioning abnormal signal, all of which signals are delivered from the engine controller 2.

The communication device 6 permits the water temperature signal and the air-conditioning signal to be entered into the drive system controller 4 from the engine controller 2 through the water temperature communication line 16 and the air-conditioning communication line 18, while causing the throttle opening signal and the engine speed signal to be brought into the drive system controller 4 from the engine controller 2 through the throttle opening communication line 28 and the engine speed communication line 30.

The drive system controller 4 controls the first and second solenoids 38 and 40, the lock-up solenoid 46, and the pressure control solenoid 50 in accordance with the entered water temperature signal, air-conditioning signal, throttle opening signal, and engine speed signal, thereby providing gearshift control and slip control. The gearshift control changes an engaged state of an auxiliary gearshift mechanism in the automatic transmission, while the slip control drives a lock-up clutch into a semi-clutch engagement.

When the engine controller 2 determines, according to the water temperature signal, that the water temperature sensor 8 is in an abnormal state, then the communication device 6 causes the above-mentioned water temperature abnormal signal to be fed into the drive system controller 4 through the water temperature communication line 24. Further, when the engine controller 2 determines according to the air-conditioning signal that the air conditioner 10 is in an abnormal state, then the communication device 6 permits the above-mentioned air-conditioning abnormal signal to be delivered to the drive system controller 4 through the water temperature communication line 24.

Both the water temperature abnormal signal and the air-conditioning abnormal signal are entered into the drive system controller 4 at any value beyond the aforesaid predetermined range "R".

The water temperature abnormal signal is fed into the drive system controller 4 through the water temperature communication line 24 at a lower limit-lessened value "$TL_L$" beyond predetermined range "R" (e.g., 4.91 milliseconds), which value is less than lower limit "TL", as illustrated by a broken line in FIG. 3. The air-conditioning abnormal signal is applied to the drive system controller 4 through the water temperature communication line 24 at an upper limit-exceeding value "$TU_U$" beyond predetermined range "R" (e.g., 29.43 milliseconds), which value is greater than upper limit "TU", as shown by a dashed line in FIG. 3.

The drive system controller 4 starts and stops executing the slip control in response to both of the water temperature abnormality signal and the air-conditioning abnormality signal, which signals are entered thereinto from the engine controller 2.

The operation of the above-described embodiment will now be described with reference to FIGS. 1 and 2.

As shown in FIG. 1, when control starts (step 100), then the engine control 2 calculates duty value "T1" within predetermined range "R" from a water temperature signal (step 102), which signal is entered from the water temperature sensor 8. The duty value varies with water temperature. Then, a determination is made on the basis of the entered water temperature signal as to whether or not there are abnormalities such as disorder of the water temperature sensor 8 or disconnection of the water temperature signal line 12 (step 104).

When the determination (step 104) results in "NO", then another determination is made in accordance with the entered air-conditioning signal as to whether there are abnormalities such as failures in the air conditioner 10 or disconnection of the air-conditioning signal line 14 (step 106). When the determination (step 106) is "NO", then the above calculated duty value "T1" is communicated to the drive system controller 4 through the water temperature communication line 24 (step 108). Then, the routine is terminated (step 110).

However, when the determination at step 104 is "YES", then duty value "T1" is brought (step 112) to the lower limit-lessened value "$TL_L$" beyond predetermined range "R", which is less than lower limit "TL", as shown in FIG. 3. Then, such duty value "T1" equal to "$TL_L$" is communicated to the drive system controller 4 through the water temperature communication line 24 (step 108). The routine is then terminated (step 110).

When the determination at step 106 is "YES" then duty value "T1 " is brought (step 114) to the upper limit-exceeding value "$TU_U$" beyond predetermined range "R", which is greater than upper limit "TU", as shown in FIG. 3. Then, such duty value "T1" equal to "$TU_U$" is communicated to the drive system controller 4 through the water temperature communication line 24 (step 108). The routine is then terminated (step 110).

Figure 2:
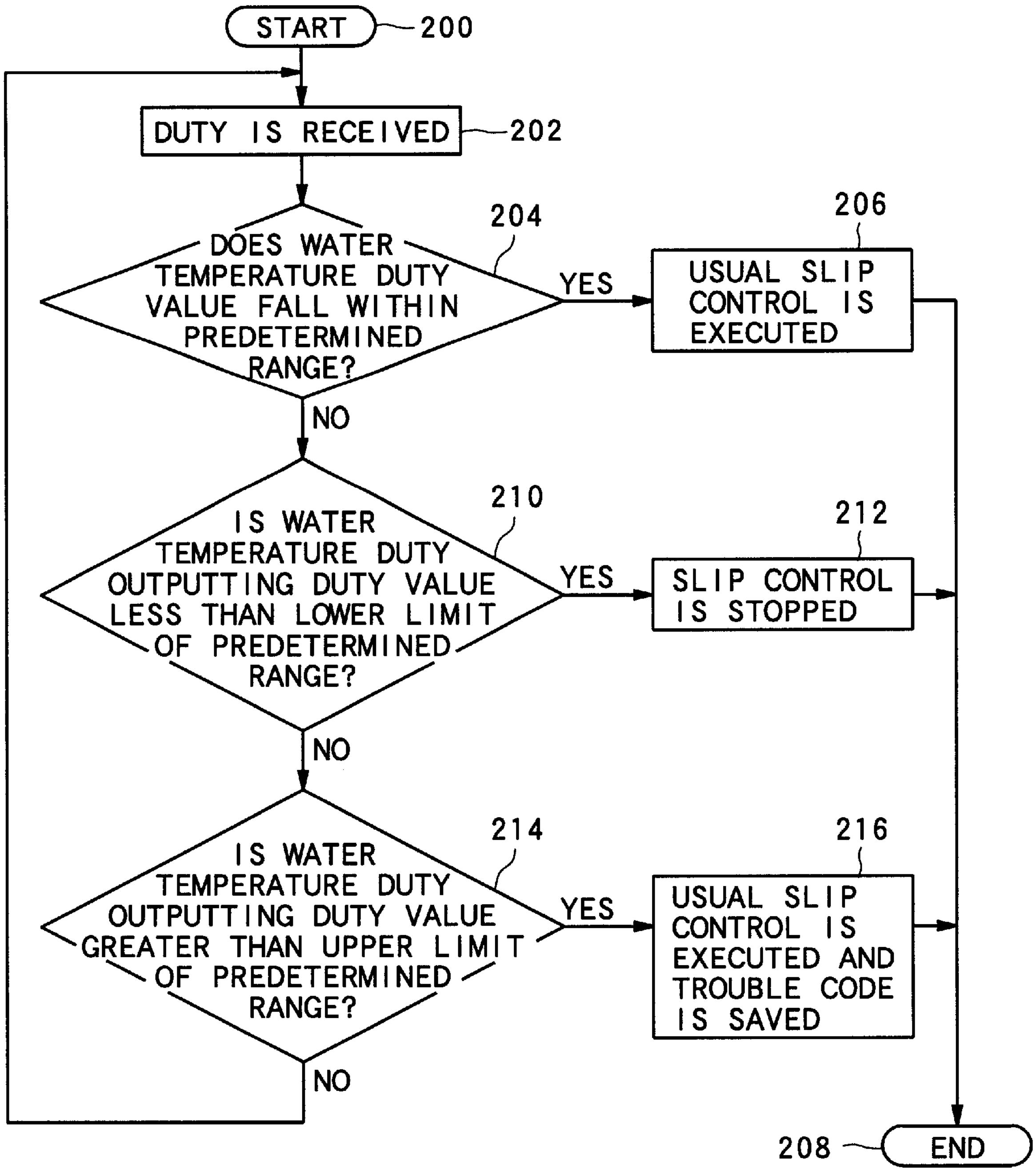
FIG. 2 is a flow chart illustrating how control is executed on the receiving side of the communication device.

Turning now to FIG. 2, when control starts (step 200), then the drive system controller 4, which has the signals entered thereinto from the engine controller 2, receives duty value "T1" (step 202). Then, a determination (step 204) is made as to whether or not duty value "T1" falls within predetermined range "R".

When the determination (step 204) is "YES", then usual slip control is executed (step 206), and thereafter the routine is terminated (step 208). When the determination (step 204) is "NO", then another determination (step 210) is made as to whether or not a water temperature abnormal signal has duty value "T1" less than the aforesaid lower limit-lessened value "$TL_L$".

When the determination (step 210) is "YES", then the slip control is stopped (step 212), and thereafter the routine is terminated (step 208). When the same determination (step 210) is "NO", then a determination (step 214) is made as to whether or not an air-conditioning abnormal signal has duty value "T1" greater than the aforesaid upper limit-exceeding value "$TU_U$" When the determination (step 214) is "YES", then usual slip control is conducted, and then a trouble code of air-conditioning abnormality is saved (step 216). Thereafter, the routine is terminated (step 208). When the same determination (step 214) is "NO", then the routine is returned to the previous determination (step 202). The trouble code is read out by a diagnosing device (not shown) during trouble checking, and air-conditioning abnormalities are thereby reported.

Pursuant to the method for providing communication between the controllers as described above, the engine controller 2 and the drive system controller 4 are provided, in which the engine controller 2 functions to feed at least the water temperature signal and the air-conditioning signal into the drive system controller 4 at the next step, while functioning to deliver the water temperature abnormal signal and the air-conditioning abnormal signal to the drive system controller 4 at the next step when the presence of abnormalities are determined. The drive system controller 4 functions to enter thereinto the aforesaid water temperature signal and air-conditioning signal as well as the water temperature abnormality signal and air-conditioning abnormality signal. One of the water temperature signal and the air-conditioning signal, i.e., the water temperature signal in the present embodiment, are fed, together with the water temperature abnormality signal and the air-conditioning abnormality signal, from the engine controller 2 into the drive system controller 4 through the same water temperature communication line 24. Thus, the above-mentioned three kinds of signals, i.e., one data signal and two abnormality signals, can be communicated by the common use of the single water temperature communication line 24.

At this time, the engine controller 2 feeds the water temperature signal into the drive system controller 4 at any duty value "T1" within predetermined range "R", which range is defined by upper limit "TU" and lower limit "TL", while feeding the water temperature abnormality signal and the air-conditioning abnormality signal into the drive system controller 4 at respective duty values "T1" of upper limit-exceeding value "$TU_U$" and lower limit-lessened value "$TL_L$". Both values "$TU_U$" and "$TL_L$" fall outside predetermined range "R", but the former value "$TU_U$" is greater than upper limit "TU", while the latter value "$TL_L$" is less than lower value "TL". As a result, one data signal and two abnormality signals can be communicated and distinctly separated from each other.

Turning now to the communication device 6, the engine controller 2 functions to cause the water temperature signal and the air-conditioning signal to be fed into the drive system controller 4 at the next step from the water temperature sensor 8 and the air conditioner 10, respectively, while feeding the water temperature abnormality signal and the air-conditioning abnormality signal to the drive system controller 4 at the next step when the presence of abnormalities is determined. The drive system controller 4 is connected to the engine controller 2 through the water temperature communication line 24 and the air-conditioning communication line 26. The drive system controller 4 serves to enter thereinto the water temperature signal as well as the water temperature abnormality and air-conditioning abnormality signals through one of the water temperature communication line 24 and the air-conditioning communication line 26, i.e., through the water temperature communication line 24 in the present embodiment, while functioning to enter the air-conditioning signal into the drive system controller 4 through the other of the above communication lines 24 and 26, i.e., through the air-conditioning communication line 26. Thus, one data signal and two abnormality signals can be communicated by the single water temperature communication line 24 being shared in common.

Figure 6:
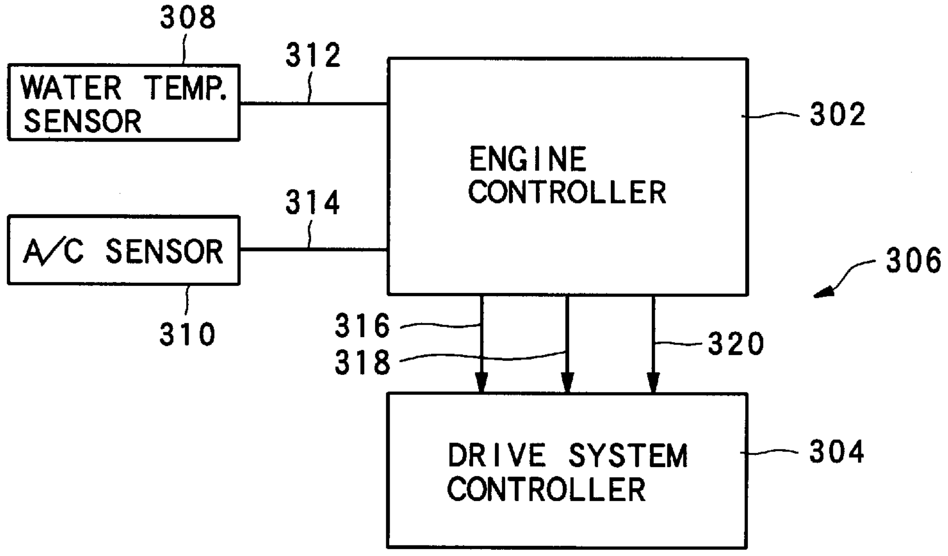
FIG. 6 PRIOR ART
FIG. 6 is a schematic structural view showing a conventional communication device according to the prior art.

As a result, the above-described communication method and communication device 6 make it possible to eliminate conventional air-conditioning abnormality communication lines (see FIG. 6), and to realize use of fewer communication lines and reduced cost. In addition, the abnormality signals can securely be communicated.

Further, with reference to the communication device 6, the first and second data output means are specifically the water temperature sensor 8 and the air conditioner 10, respectively, both of which are auxiliary devices or equipment provided on an engine, which engine is disposed in a mobile body such as a vehicle. In addition, the first and second controllers are specifically the engine controller 2 and the drive system controller 4, respectively, in which the former controller 2 controls the above-mentioned engine, while the latter controller 4 is a drive system controller for controlling an automatic transmission in a drive system, which transmission is connected to the engine. As a result, the common use of the communication line provides fewer communication lines, and further provides a common signal-processing section associated with the controllers 2 and 4. Thus, compact controllers 2 and 4 are achievable.

Consequently, space where the controllers are disposed can be reduced in mobile bodies such as vehicles, and thus a space-saving and lighter-weight mobile body is attainable.

As detailed above, pursuant to the present invention, one data signal and two abnormality signals can be communicated by the common use of a single communication line, while one data signal and two abnormality signals can be communicated and distinctly separated from each other. Further, the common use of the communication line enables fewer communication lines and a common processing section associated with the controllers, with consequential compact controllers.

Thus, the present invention provides fewer communication lines, reduced costs, and reliable communication of abnormality signals. The present invention further provides compact controllers, thereby realizing a space-saving and lighter-weight mobile body such as a vehicle, in which a space where the controllers are positioned can be reduced.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A method for providing communication between first and second controllers, in which the first controller functions to enter thereinto at least first and second data signals from first and second data output means respectively and then feeds the first and second data signals into the second controller at a next step, the first controller further functioning to determine whether there are abnormalities in the data output means on the basis of the entered first and second data signals, the first controller still further functioning to feed first and second abnormality signals into the second controller at the next step when a determination is made that there are abnormalities present in the data output means, the first and second abnormality signals representing respective abnormal states of the first and second data output means, wherein one of the first and second data signals as well as both of the first and second abnormality signals are fed into the second controller at the next step from the first controller through a common communication line.

2. A method for providing communication between controllers as defined in claim 1, wherein the second controller functions to enter thereinto the first and second data signals as well as the first and second abnormality signals, all of which signals are fed from the first controller, and wherein the first controller feeds one of the first and second data signals into the second controller at any value within a predetermined range, the predetermined range being defined by upper and lower limit values, while the first controller feeds the first and second abnormality signals into the second controller at an upper limit-exceeding value and a lower limit-lessened value respectively, in which the upper limit-exceeding value is greater than the upper limit value while the lower limit-lessened value is less than the lower limit value, both of the upper limit-exceeding value and the lower limit-lessened value falling outside the predetermined range.

3. A communication device used with first and second controllers, wherein the first controller is provided with first and second data output means having the function of feeding at least first and second data signals respectively into the first controller, the first controller functioning to enter thereinto the first and second data signals and then to feed the signals into the second controller at a next step in a state of the first controller being connected to the first and second data output means through first and second signal lines, respectively, the first controller further functioning to determine the presence of abnormalities on the basis of the first and second data signals, the first controller further functioning to feed first and second abnormality signals into the second controller at the next step when a determination is made that there are abnormalities present in the data output means, the first and second abnormality signals representing respective abnormal states of the first and second data output means, and wherein the second controller is connected to the first controller through first and second communication lines, the second controller functioning to enter thereinto one of the first and second data signals as well as both of the first and second abnormality signals, all of the signals being fed into the second controller from the first controller through one of the first and second communication lines, the second controller further functioning to enter thereinto the other of the first and second data signals which are fed into the second controller from the first controller through the other of the first and second communication lines.

4. A communication device as defined in claim 3, wherein the first and second data output means are auxiliary equipment provided on an engine, the engine being disposed in a mobile vehicle body, the first controller comprises an engine controller for controlling the engine, and the second controller comprises a drive system controller for controlling a drive system connected to the engine.

5. A method for providing communication between first and second controllers comprising:

the first controller entering thereinto at least first and second data signals from first and second data output means, respectively;

the first controller determining whether there are abnormalities in the first or second data output means on the basis of the entered first and second data signals;

the first controller for feeding first and second abnormality signals into the second controller through a common communication line when the determination is made that there are abnormalities present in the first or second data output means; and the first controller feeding one of the first and second data signals through the common communication line.

6. The method for providing communication between the first and second controllers of claim 5, wherein when the first controller feeds the first data signal into the second controller, the first data signal has a value within a predetermined range, the predetermined range being defined by upper and lower limit values, when the first controller feeds the first and second abnormality signals into the second controller on the common communication line, the first abnormality signal has an upper limit-exceeding value and the second abnormality signal has a lower limit-lessened value, respectively, in which the upper limit-exceeding value is greater than the upper limit value, while the lower limit-lessened value is less than the lower limit value, such that both of the upper limit-exceeding value and the lower limit-lessened value fall outside the predetermined range.

7. The method for providing communication between the first and second controllers of claim 5, wherein the first controller comprises an engine controller and the second controller comprises a drive system controller.

8. The method for providing communication between the first and second controllers of claim 5, wherein the first and second abnormality signals correspond to abnormalities of a water temperature sensor and an air conditioner.

* * * * *